United States Patent [19]
Vornberger

[11] 3,807,759
[45] Apr. 30, 1974

[54] CARGO TRAILER LOAD RESTRAINING ARRANGEMENT

[75] Inventor: George F. Vornberger, Cincinnati, Ohio

[73] Assignee: Pullman Incorporated, Chicago, Ill.

[22] Filed: Mar. 5, 1973

[21] Appl. No.: 338,021

[52] U.S. Cl............ 280/179, 105/369 A, 248/361 A
[51] Int. Cl.............................................. B60p 7/08
[58] Field of Search............ 280/179 A; 105/396 A; 248/361 R, 361 A; 244/118

[56] References Cited
UNITED STATES PATENTS

| | | | |
|---|---|---|---|
| 3,481,627 | 12/1969 | Felburn | 280/179 A |
| 3,633,937 | 1/1972 | Hlinsky | 280/179 A |
| 2,605,064 | 7/1952 | Davis | 280/179 A |
| 3,187,686 | 6/1965 | De Podesta | 105/369 A |
| 3,685,778 | 8/1972 | Berns | 105/369 A |
| 3,353,780 | 11/1967 | Young | 248/361 R |

Primary Examiner—Robert R. Song
Attorney, Agent, or Firm—Hilmond O. Vogel

[57] ABSTRACT

A flat bed highway trailer is provided with three longitudinal beams, the intermediate beam including a plurality of longitudinally spaced recesses which are provided to support connector plates at a plurality of positions with said connector plates being interconnected by a chain type of securing sling for securing a load to the trailer bed.

7 Claims, 6 Drawing Figures

3,807,759

PATENTED APR 30 1974

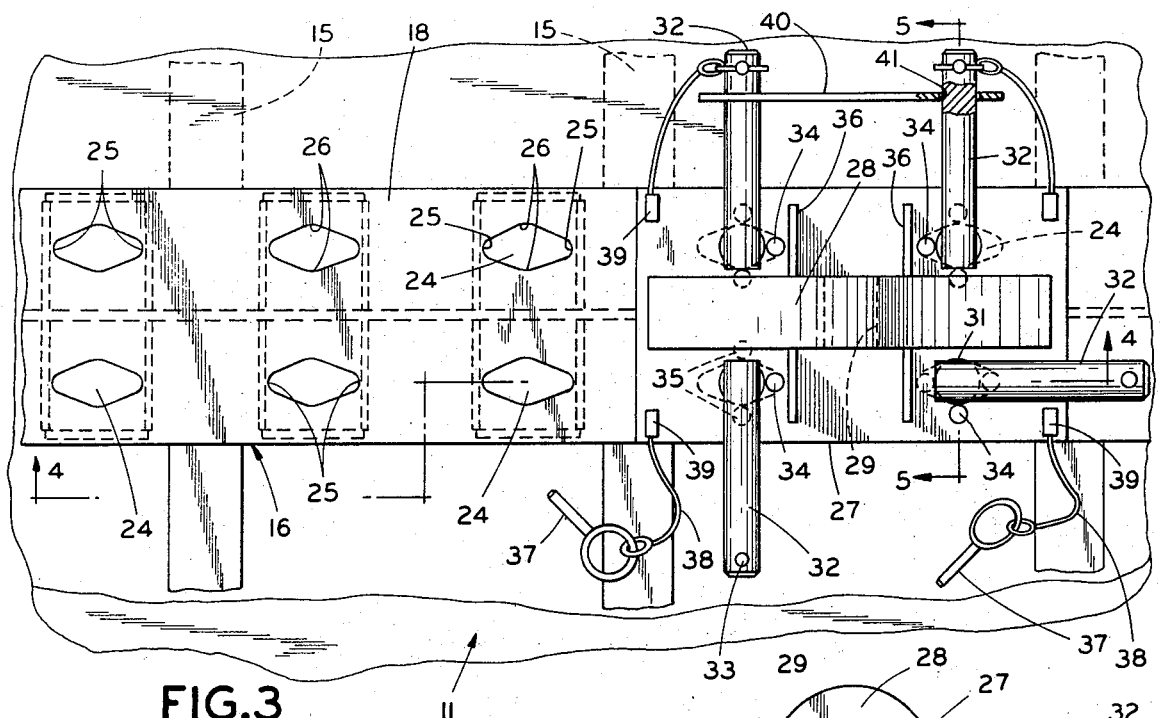
FIG.3
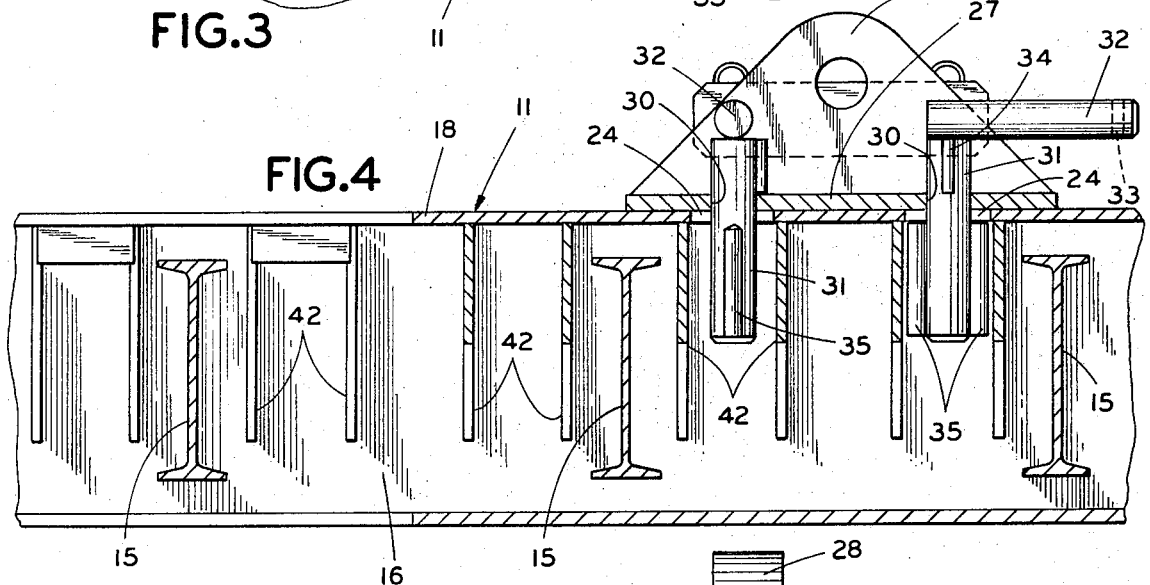
FIG.4
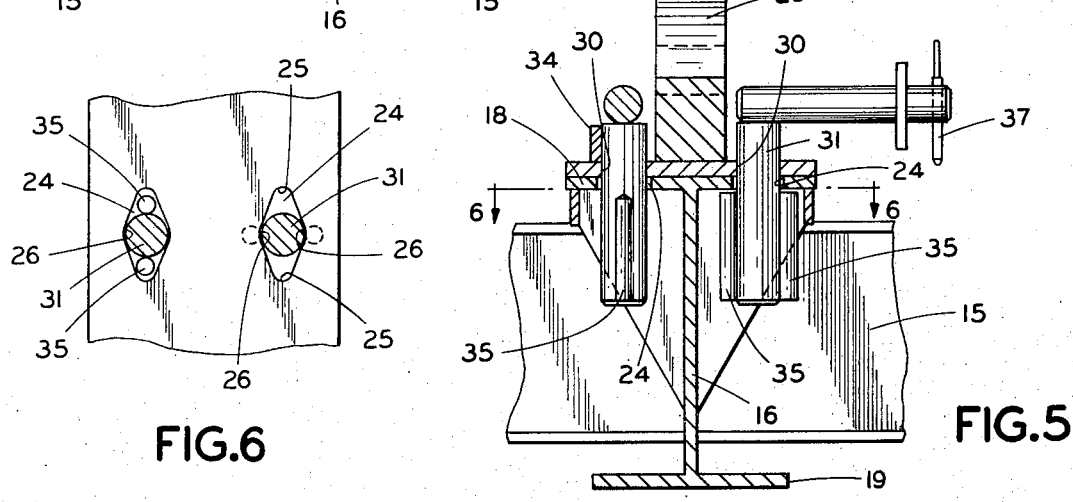
FIG.6
FIG.5

3,807,759

CARGO TRAILER LOAD RESTRAINING ARRANGEMENT

BACKGROUND OF THE INVENTION

1. Field of the Invention

The invention relates to a flat bed truck trailer and particularly to a load securing arrangement for securing cargo to the bed of the trailer.

2. Description of the Prior Art

Brohling U.S. Pat. No. 3,295,464 discloses a flat bed trailer which is particularly adapted for hauling cargo of various configurations. The Brohling patent shows the concept of connecting cargo restraining assemblies in adjustable relation to the floor structure and particularly to the longitudinally extending beams. The Storch U.S. Pat., Nos. 2,532,743, and Davis, 2,605,064, disclose similar load restraining devices which are arranged for adjustably securing cargo restraining chains and slings whereby different types of cargo may be secured to the flat bed of a trailer. The present invention relates to an improvement of a cargo securing arrangement which permits the cargo to be securely connected to the central beam of a flat bed trailer in a quickly adjustable and safe arrangement preventing any possibility of a connector arrangement from becoming unfastened relative to the central beam structure of the trailer bed.

SUMMARY OF THE INVENTION

The present invention comprises a flat bed trailer which is provided with three longitudinal beams with the intermediate beam serving to act as the anchoring means for an adjustable securing and connector arrangement. The central beam is provided with upper flanges which include laterally spaced longitudinally extending rows of openings of a particular configuration having narrow opposite ends and having substantially wider spaced edges at the central portion of the openings. A pair of longitudinally spaced connector plates are adapted to be rigidly secured to the upper flanges of the intermediate beam. Each of the connector plates comprises a plurality of vertically projecting keys which are turnable about the vertical axis, each said key including lower projections which in one position permit the keys to be inserted through the slots whereupon the keys are then rotated about the vertical axis and the projections engage the underneath surfaces of the flange of the intermediate beam to securely lock the connector plates in position. The construction permits rapid locking and unlocking of the chain assemblies which are connected to the connector plates. The keying arrangement permits the quick assembly and disassembly of the connector plates relative to the intermediate beam.

BRIEF DESCRIPTION OF THE DRAWINGS

FIG. 3 is an enlarged view of a portion of a trailer bed with a connector plate assembly secured to an intermediate beam;

FIG. 4 is a cross sectional view taken substantially along the line 4—4 of FIG. 3;

FIG. 5 is a cross sectional view taken substantially along the line 5—5 of FIG. 3; and FIG. 6 is a cross sectional view taken along the line 6—6 of FIG. 5.

DESCRIPTION OF THE PREFERRED EMBODIMENT

Figure 1:
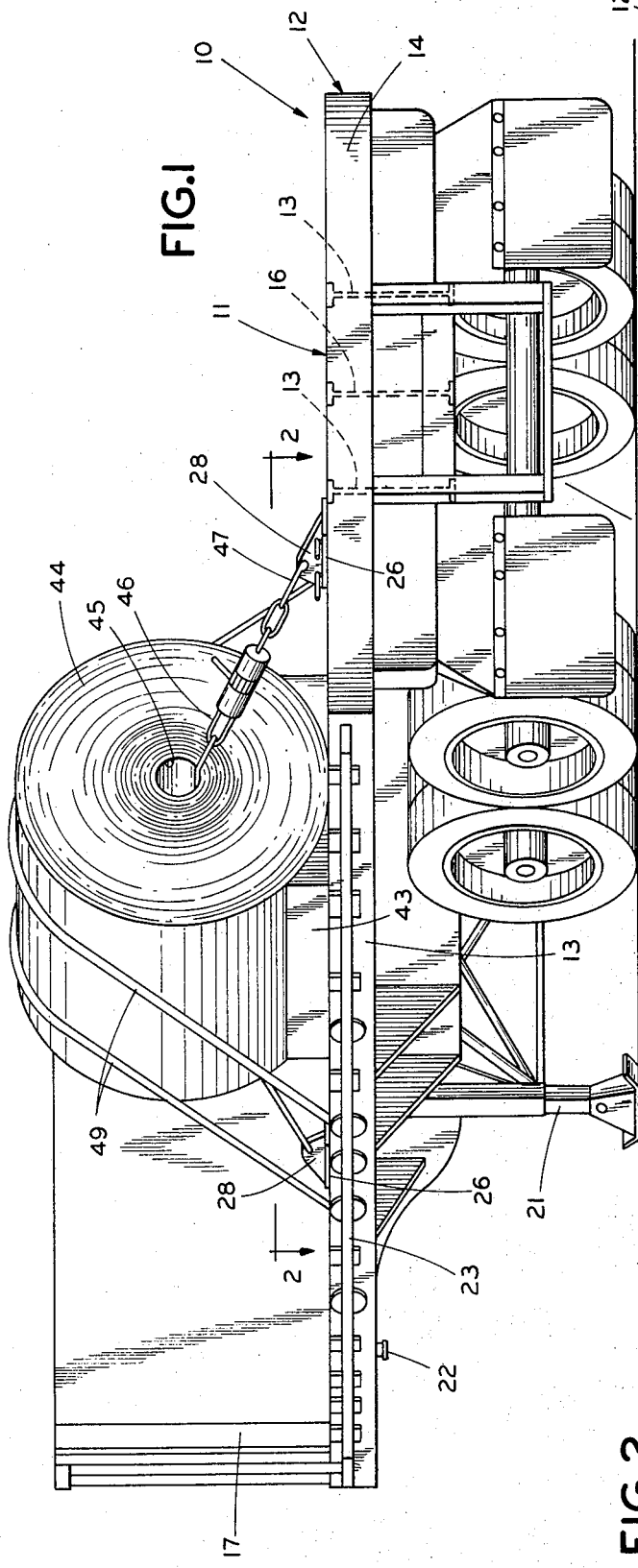
FIG. 1 is a perspective view of a flat bed trailer showing a load supported thereon and securely tied to the bed of a trailer.
Figure 2:
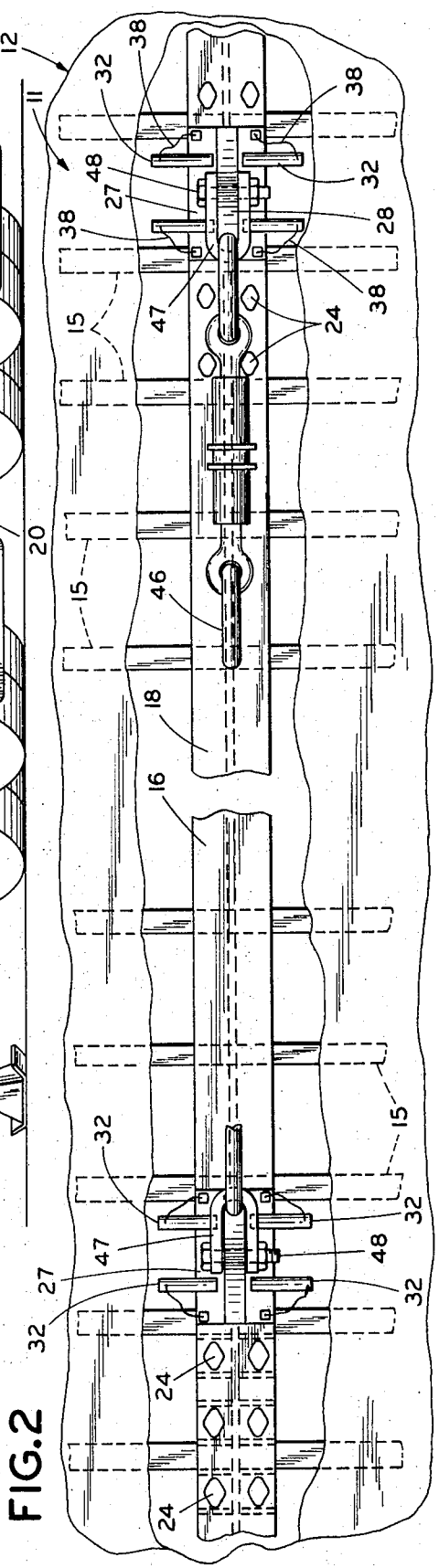
FIG. 2 is a cross sectional view taken substantially along the line 2—2 of FIG. 1.

FIG. 1 discloses a highway trailer 10 which may be suitably pulled by a highway tractor. The trailer 10 includes a flat bed or floor 11. The flat bed 11 is supported on a frame 12 comprising a pair of longitudinally extending laterally spaced side I-beams 13 suitably interconnected by a transversely extending end member 14. As best shown in FIGS. 2, 3 and 4, the frame 12 is further reinforced by a plurality of longitudinally spaced and transversely extending I-beams 15, suitably interconnected with the side beams 13 and an intermediate longitudinally extending I-beam 16. The forward end of the frame 12 is provided with a vertically extending bulkhead 17.

The intermediate longitudinally extending I-beam 16 comprises upper flanges 18 and lower flanges 19. The trailer is suitably suspended on a conventional tandem wheel suspension 20 and also may be supported at its forward end by means of a conventional front support or landing gear 21. A conventional kingpin 22 is provided for attachment to the fifth wheel of a suitable tractor vehicle (not shown). The longitudinal side beams have connected thereto suitable connector rails 23 which are conventional and to which chains or other securing members may be connected for assisting in the tie-down of cargo on the flat bed of the trailer. The flanges 18 of the intermediate longitudinal I-beam 16 are provided with two longitudinally extending transversely spaced rows of connector slots, each being designated at 24.

Each connector slot 24, as best shown in FIG. 6, includes at opposite ends thereof narrow arcuate edge portions 25 which diverge toward the center of the slot and connect to wide edge portions designated at 26.

As best shown in FIG. 1, connector plates 27 may be rigidly secured and supported on the I-beam 16. Each connector plate 27 has connected thereto a bracket 28 including a transverse bore 29. Each connector plate 27 is also provided with four spaced openings 30 and a cylindrical rod type of key 31 is secured within each of said openings and is adapted to be rotated about a vertical axis. Each key 31 includes a handle 32 which is provided at its end with a vertical bore 33.

Each of the keys 31 also is provided with single upper cylindrical projection 34, as best shown in FIGS. 3, 4 and 5, the said projection being disclosed as being cylindrical though other shapes such as square or rectangular would be equally effective. Each key by means of each projection 34 is thus supported on the connector plates 27. Lower projections 35 of similar configuration as the projections 34 are provided at the lowermost portions of the keys 31, said projections 35 being disposed in opposed relation on opposite sides of each key 31. The projections 35 are provided to lock the keys 31 against upward displacement when the connector plates are firmly attached for cargo restraining operation. The connector plates 27 also include upward extending gussets 36 connected to the bracket 28 for further reinforcing the same. Lock pins 37 are connected to flexible elements 38 in turn suitably anchored as indicated at 39 to the connector plates, the said lock pins 37 being adapted to be positioned through the bores 33 to prevent removal of the keys 31 when the connector plate is securely locked in position. As indicated in FIG. 3, lock plates 40 having openings 41 also may be inserted over the handles 32 to prevent their rotation and thus further assist in positively locking the connector plates in the locked position against inadvertent removal. As best shown in FIG. 4, gussets 42 are connected to the underneath sides of the flange 18 immediately adjacent opposite ends of the connector slots 24 to further reinforce the flanges.

As shown in FIG. 1, a pallet 43 is adapted to support a metal coil 44 which is provided with a central opening 45 through which a securing chain assembly 46 extends. The ends of the securing chain assembly 46 are suitably connected to clevises 47 which in turn are connected to the longitudinally spaced connector plates 27 by means of nut and bolt connectors 48 extending through the openings 29. The metal coil 44 is further tied down to the flat bed by means of transversely extending straps 49 connected to the side connector rails 23 in conventional fashion.

The securing chain assembly 46 is conventional. In the connection of the connector plates 27 to the intermediate I-beam 16, the keys 31 are merely turned to the position exemplified by the lower right hand key in FIG. 3 wherein the handle is disposed in longitudinal extending relation relative to the I-beam 16. This is also shown in FIG. 6 by the full line position on the left hand side wherein the lower projections 35 are in longitudinally aligned position with the slots 24 and thus the keys can be inserted in this position through the said slots. The handles are then moved to the laterally extending position shown in FIGS. 3 and 4 wherein the projections 35 now underlie the underneath portions of the flange immediately adjacent the wide end portions 26 of each of the slots. This is the locked position since obviously the keys cannot be withdrawn and the connector plates are now firmly locked to the upper flanges of the intermediate I-beam. The upper cylindrical projections 34, of course, serve to prevent the keys from falling through the openings 30 since the projections 34 engage the upper surfaces of the flange 18. With the handles all positioned as shown in FIG. 2, it is a simple matter to insert the lock plates 40 over the handles 32 and then to attach the lockpins 37 which effectually prevent dislocation of the keys from the desired locked position. When it is desired to unlock the keys it is a simple matter to position all of the handles in the longitudinally aligned relation relative to the longitudinal I-beam, whereupon the connector plates 27 can immediately be removed from locking engagement.

What is claimed is:
1. A cargo vehicle comprising:
a flat cargo supporting bed,
a frame supporting said bed including:
   a pair of transversely spaced longitudinally extending outer beams and an intermediate beam, said intermediate beam having an upper horizontal flange,
   transversely extending support members connecting said beams below said bed,
a cargo tie-down arrangement for securing cargo on said bed including a pair of connector plates supported on said intermediate beams in relatively longtudinally spaced relation,
a flexible element connected to each of said connector plates and said flexible element being adapted to connect to and secure cargo on said bed,
means adjustably connecting said plates to said intermediate beam,
said flange of said intermediate beam having a plurality of elongated openings,
at least one key member rotatably mounted on each plate and restricted against downward movement relative to each said connector plate, each key member having projections and being movable through said openings to said flange in one position of said key member, and
each key member being manually rotatable about a vertical axis whereupon said projections engage underneath portions of said flange adjacent said openings whereupon said plates are fixedly and releasably secured to said intermediate beam.
2. The invention in accordance with claim 1,
said elongated openings being provided on said flange in two rows laterally spaced and
each plate having laterally spaced key members connected thereto for engagement with a pair of laterally spaced openings.
3. The invention in accordance with claim 1, said openings having narrow edge portions at opposite ends and relatively wide edge portions intermediate thereof with diverging edges connecting said narrow and wide edge portions,
said projections on said keys being spaced apart on opposite sides of said keys and movable through said openings adjacent said narrow edge portions during said one position.
4. The invention in accordance with claim 3, said keys having cylindrical portions between said projections and said wide edge portions being of curved configuration conforming to said cylindrical portions.
5. The invention in accordance with claim 4, the dimension between the outermost extent of said projections being less than the length dimension of said openings, and being more than the width of said openings at said wide edge portions.
6. The invention in accordance with claim 5, each said key including a handle member.
7. The invention in accordance with claim 6, each said key having an upper projecting portion extending laterally outwardly,
each plate including vertical openings in which a key is rotatably positioned and said upper projection being above said plate and said other projections being below said plate.

* * * * *